United States Patent [19]

Kuze et al.

[11] 4,454,312

[45] Jun. 12, 1984

[54] BIAXIALLY STRETCHED POLYESTER FILMS

[75] Inventors: Katsuaki Kuze; Hiroshi Hashimoto, both of Otsu; Takeshi Ohta, Tsuruga; Tsukasa Akaishi, Otsu; Kunio Takeuchi, Inuyama; Hiroyoshi Kamatani, Otsu, all of Japan

[73] Assignee: Toyo Boseki Kabushiki Kaisha, Japan

[21] Appl. No.: 448,554

[22] Filed: Dec. 10, 1982

[30] Foreign Application Priority Data

Dec. 12, 1981 [JP] Japan ................................ 56-200592

[51] Int. Cl.$^3$ ..................... C08G 63/04; C08G 63/30
[52] U.S. Cl. .................................... 528/275; 528/272;
528/274; 528/279; 528/283; 528/285; 528/286;
528/308.1; 528/308.2
[58] Field of Search ............... 528/272, 274, 275, 279,
528/283, 285, 286, 308.1, 308.2

[56] References Cited

U.S. PATENT DOCUMENTS

| 3,795,639 | 3/1974 | Chimura et al. | 528/283 |
| 3,817,931 | 6/1974 | Brooks et al. | 528/275 |
| 4,008,207 | 2/1977 | Omoto et al. | 528/275 |
| 4,067,855 | 1/1978 | Miwa et al. | 528/275 |
| 4,104,263 | 8/1978 | Kenney | 528/279 |

Primary Examiner—Lucille M. Phynes
Attorney, Agent, or Firm—Jones, Tullar & Cooper

[57] ABSTRACT

A biaxially stretched polyester film comprising a polyester and zirconium as an internal particle material, produced by polycondensation of terephthalic acid or its esterified derivative and alkylene glycol as the major essential monomeric components in the presence of a polycondensation catalyst, during which zirconium in the form of any compound thereof in an amount of 80 to 2500 ppm in terms of zirconium atom to the polyester as produced being introduced into the reaction system at a stage after the initiation of the reaction and before the intrinsic viscosity of the reaction mixture reaching 0.2, and subjecting the produced polyester to film forming.

20 Claims, No Drawings

BIAXIALLY STRETCHED POLYESTER FILMS

BACKGROUND OF THE INVENTION

This invention relates to a biaxially stretched polyester film excellent in physical properties, particularly in slipping property.

Polyester films prepared from saturated linear polyesters such as polyethylene terephthalate are useful as packaging materials, photographic films, magnetic tapes, etc. owing to their excellent mechanical properties, heat-resistance, weathering resistance, electric insulation and chemical resistance, etc. However, polyester films have a high friction coefficient which affords a bad influence upon processing efficiency in stretching or upon workability in take-up, cutting and coating. Thus, a film which has a low friction coefficient and is excellent in slipping property has been highly demanded.

It is known that the slipping property of a polyester film can be improved by incorporating fine particles therein so as to make fine irregularities at the surfaces of the film. For attaining this purpose, there are known two methods, of which one is the external particle method wherein fine particles inert to a polyester such as titanium dioxide, kaolinite, talc or silica are added to the polyester during its production, and the other is the internal particle method wherein fine particles are formed by the reaction of a carboxylic acid component, an oligomer or a phosphorus compound with a metal compound during the production of the polyester. The internal particle method is superior to the external particle method in the following respects: (i) the equipment investment can be decreased because the apparatuses for pulverization, classification and dispersion of particles are not required; (ii) the use of a dispersing agent, which may deteriorate the heat resistance and electric properties of the resulting polymer yet is essential in the external particle method for preventing the formation of fish eyes by cohesion of particles, is unnecessary; (iii) the particles formed in the internal particle method are generally low in hardness so that the resultant product is excellent in abrasion resistance; (iv) the particles formed in the internal particle method have a good compatibility with a polyester so that the formation of voids on stretching can be avoided; and (v) the refractive index of the formed particles is quite close to that of a polyester, and therefore the transparency of the resultant product is excellent.

In the internal particle method, the particles are usually produced from the residue of a catalyst for ester-exchange such as an alkali metal or an alkaline earth metal, and the amount and size of particles are controlled by a phosphorus compound (e.g. U.S. Pat. No. 4,096,109). However, this conventional procedure is not satisfactory in that it has the following disadvantages: (i) the particles of large size are apt to be produced, and the resulting product is not only inferior in transparency but also contains fish eyes; (ii) the scales are frequently produced in the polymerization reactor, peel off into the polyester product and form fish eyes; (iii) the polymerization conditions must be strictly controlled in order to keep the amount and size of particles constant; (iv) the particle concentration tends to lower under the conditions for minimization of the particle size, and the uniform formation of fine particles in a high concentration is difficult; and (v) the concentration and average size of particles can be controlled only within a narrow range which can not meet all the requirements of users.

In recent years, the requirements of users to the surface properties of films have diversified and the base films having various surface properties are demanded depending upon usages. For example, in case of the films for magnetic tapes, the smoothness of surface is strictly required in one usage, while the slipping property is strictly demanded and the smoothness may be sacrificed to some extent in another usage. Further, the requirements to surface properties are remarkably different according to users even in the same usage. Since the surface properties depend on particle concentration, particle size distribution and kind of particle materials, it is necessary to establish a technique which enables a satisfactory control of the particle concentration, particle diameter and particle size distribution in the manufacturing process of polyester to satisfy the users' demands. However, such a technique has not been established until now.

SUMMARY OF THE INVENTION

As a result of extensive study, it has now been found that the formation of particles comprising zirconium in a polyester can afford a biaxially stretched film excellent in slipping property as well as transparency without the said defect as observed on conventional films.

The biaxially stretched polyester film of the invention is characteristic in that zirconium comprises an essential component for the internal (or first) particle material.

The polyester used for manufacture of the polyester film of the present invention may be the one comprising not less than 80 mol % of the repeating units of alkylene terephthalate (e.g. ethylene terephthalate, propylene terephthalate). When other repeating units are to be included therein, those may be derived from monomeric dicarboxylic acids (e.g. isophthalic acid, p-$\beta$-hydroxyethoxybenzoic acid, 2,6-naphthalenedicarboxylic acid, 4,4'-dicarboxydiphenyl-4,4'-dicarboxybenzophenone, bis(4-carboxyphenyl)ethane, adipic acid, sebacic acid, 5-sodium sulfoisophthalic acid) and their alkyl esters, glycols (e.g. ethylene glycol, propylene glycol, butanediol, neopentyl glycol, diethylene glycol, cyclohexanedimethanol, bisphenol A/ethylene oxide adduct), etc. The polyester may include further any other monomeric units which can form amide bond, urethane bond, ether bond, carbonate bond, etc. Thus, any polyester containing at least 80 mol % of polyalkylene terephthalate, particularly polyethylene terephthalate, and having a film forming property can be employed as the base resin.

DETAILED DESCRIPTION

The polyester base resin can be prepared by various processes. For example, polyethylene terephthalate may be prepared by ester-exchange of dimethyl terephthalate with ethylene glycol, followed by polycondensation of the resultant bis-$\beta$-hydroxyethyl terephthalate while removal of ethylene glycol, or by direct esterification of terephthalic acid with ethylene glycol, followed by polycondensation of the resulting bis-$\beta$-hydroxyethyl terephthalate while removal of ethylene glycol. In any case, zirconium may be introduced into the reaction system at any stage after the initiation of the reaction but before the intrinsic viscosity of the reaction mixture reaches 0.2 as the result of the progress of the polycondensation. For ester-exchange or esterification and polycondensation, the use of an appropriate conventional catalyst(s) is advisable. It is also advisable to incorporate a phosphorus compound, an alkali metal compound, an alkaline earth metal compound or the like into the reaction system for enlargement of the control ranges of the concentration of particles, of the average particle size, of the distribution of particle size, etc. owing to zirconium.

Zirconium is an essential component for the internal particle material and may be used in any conventional form. Usually, it is employed in the form of any compound soluble into the reaction system. Examples of the usable zirconium compound are zirconium alkoxides (e.g. tetra-n-propyl zirconate, tetraisopropyl zirconate, tetra-n-butyl zirconate, tetra-n-amyl zirconate), zirconyl salts of organic acids (e.g. zirconyl acetate, zirconyl formate, zirconyl tartrate, zirconyl oxalate, zirconyl stearate, zirconyl benzoate), zirconyl salts of inorganic acids (e.g. zirconyl chloride, zirconyl bromide, zirconyl carbonate, zirconyl ammonium carbonate), etc.

As stated above, the phosphorus compound is effective in enlarging the control ranges of the concentration of particles, of the average particle diameter and of the particle size distribution, those particles being formed by the use of zirconium. Examples of the phosphorus compound include phosphoric acid, phosphorous acid, phosphonic acid, etc. as well as derivatives thereof. More particularly, there may be exemplified phosphoric acid, trimethyl phosphate, triethyl phosphate, tributyl phosphate, triphenyl phosphate, monomethyl phosphate, dimethyl phosphate, monoethyl phosphate, diethyl phosphate, monobutyl phosphate, dibutyl phosphate, phosphorous acid, trimethyl phosphite, triethyl phosphite, tributyl phosphite, triphenyl phosphite, monomethyl phosphite, dimethyl phosphite, monoethyl phosphite, diethyl phosphite, monobutyl phosphite, dibutyl phosphite, methyl phosphonic acid, dimethyl methylphosphonate, dimethyl ethylphosphonate, dimethyl phenylphosphonate, diethyl benzylphosphonate, diphenyl phenylphosphonate, etc. These can be used either individually or in combination. The latter case is advantageous in that the range of controlling particle diameter or particle size distribution is particularly enlarged.

The alkali metal compound and the alkaline earth metal compound are also effective in enhancement of the effect of zirconium. In general, any alkali metal or alkaline earth metal compound may be employed insofar as it is soluble in the reaction system. Examples of the alkali metal or alkaline earth metal compound are alkali or alkaline earth metal carboxylates, carbonates, hydrides, alkoxides, etc. More specifically, there may be exemplified lithium acetate, sodium acetate, potassium acetate, rubidium acetate, cesium acetate, berillium acetate, magnesium acetate, calcium acetate, strontium acetate, barium acetat, lithium formate, magnesium formate, calcium formate, lithium benzoate, sodium benzoate, potassium benzoate, lithium carbonate, sodium carbonate, potassium carbonate, lithium hydride, sodium hydride, potassium hydride, magnesium hydride, calcium hydride, lithium methoxide, sodium methoxide, potassium methoxide, sodium ethoxide, magnesium methoxide, magnesium ethoxide, calcium methoxide, calcium ethoxide, etc.

The zirconium compound, the phosphorus compound and the alkali metal and/or alkaline earth metal compound(s) may be usually employed in the following ranges:

(A) Unitary system of zirconium compound
  $80 \leq [Zr] \leq 2500$
(B) Binary system of zirconium compound and phosphorus compound
  $80 \leq [Zr] \leq 2500$
  $0.1 \leq Zr/P \leq 10$
(C) Ternary system of zirconium compound, phosphorus compound and alkali metal compound
  $20 \leq [Zr] \leq 2000$
  $20 \leq [M_1] \leq 300$
  $0.1 \leq (Zr + \frac{1}{2}M_1)/P \leq 5$
(D) Ternary system of zirconium compound, phosphorus compound and alkaline earth metal compound
  $20 \leq [Zr] \leq 2000$
  $50 \leq [M_2] \leq 500$
  $0.5 \leq (Zr + M_2)/P \leq 3$
(E) Quaternary system of zirconium compound, phosphorus compound, alkali metal compound and alkaline earth metal compound
  $20 \leq [Zr] \leq 2000$
  $20 \leq [M_1] \leq 300$
  $20 \leq [M_2] \leq 300$
  $0.5 \leq (Zr + \frac{1}{2}M_1 + M_2)/P \leq 3$ wherein [Zr] represents the amount of the zirconium compound in terms of Zr (ppm) to the produced polyester, $[M_1]$ and $[M_2]$ represent respectively the amounts of the alkali metal compound in terms of the alkali metal atom (ppm) and of the alkaline earth metal compound in terms of the alkaline earth metal atom (ppm) to the produced polyester and Zr/P, $(Zr + \frac{1}{2}M_1)/P$, $(Zr + M_2)/P$ and $(Zr + \frac{1}{2}M_1 + M_2)/P$ represent respectively the atomic ratios.

When the amount of the zirconium compound is smaller than the lower limit, the produced amount of the particles is too low to give a satisfactory slipping property. When the amount of the zirconium compound is larger than the upper limit, the particle size becomes too large so that the transparency is deteriorated. In addition, the color of the produced polymer is poor.

When the phosphorus compound is employed in a smaller amount than the lower limit, it does not produce any material particle. When the phosphorus compound is employed in a larger amount than the upper limit, the polymerization rate is unfavorably lowered. Further, the softening point and stability of the produced polymer are reduced.

When the amount of the alkali metal or alkaline earth metal compound is within the above range, the control of the particle diameter and the particle size distribution can be efficiently done. On the other hand, when the amount exceeds the above range, the particle size becomes too large, whereby fish eyes may be produced. Further, the stability of the produced polymer is deteriorated.

The zirconium compound, the phosphorus compound and the alkali metal and/or alkaline earth metal compound may be introduced into the reaction system at any convenient stage between the initiation of ester-exchange or esterification and the stage at which the intrinsic viscosity of the reaciton mixture reaches 0.2. When introduced after the intrinsic viscosity reaches 0.2, the polyester of uniform quality is hardly obtainable.

Since the molecular weight of the reaction product is extremely low and the viscosity of the reaction mixture is not high at the stage around the intrinsic viscosity reaches 0.2, the reaction mixture can be sufficiently stirred up to the said stage. Introduction of the above compounds may either be made separately or simultaneously. However, when the polyester is prepared by the ester-exchange method, it is advisable to add the phosphorus compound after the ester-exchange reaction is over, because such reaction tends to be prevented in the presence of the phosphorus compound. When the polyester is prepared by the direct polymerization method, it is advisable to add the phosphorus compound after the addition of the zirconium compound and the alkali metal and/or alkaline earth metal compound(s), because otherwise the formation of an ether bond will increase. The particle concentration, average particle diameter and particle size distribution, etc. can be varied over a wide range by changing the amount, proportion, time and order of addition and kind of the zirconium compound, the phosphorus compound and the alkali metal and/or alkaline earth metal compound(s). The average particle diameter is generally from about 0.2 to $5\mu$. Suitable kind, combination, amount and time of addition of the above compounds vary depending on the surface properties of the desired final product.

It is the primary advantage of the present invention that the particle concentration, average particle diameter and particle size distribution can be controlled according to the surface properties of the desired final product.

The variation of the particle concentration, average particle diameter and particle size distribution is extremely manifold, and it is difficult to take a sweeping view; however, a general view may be taken as follows:

(A) Unitary system of the zirconium compound:

(A-1) The particle concentration remarkably depends upon the amount of the zirconium compound and is enlarged as the amount of the zirconium compound increases.

(A-2) The particle diameter remarkably depends upon the time of addition of the zirconium compound. When the zirconium compound is added before the initiation of the reaction, the average particle diameter decreases and the particle size distribution sharpens. Contrarily, when the zirconium compound is added after the ester-exchange or esterification reaction is over, the average particle diameter increases and the particle size distribution broadens. The particle diameter is generally about 0.2 to $2\mu$, though it can be controlled in the above described manner.

(B) Binary system of the zirconium compound and the phosphorus compound:

(B-1) The particle concentration remarkably depends upon the amount of the zirconium and is enlarged as the amount of the zirconium compound increases.

(B-2) This system has a tendency to reduce extremely the particle size and to sharpen exceedingly the particle size distribution. The average particle diameter is generally about 0.2 to $1\mu$.

(C) Ternary or quaternary system of the zirconium compound, the phosphorus compound and the alkali metal and/or alkaline earth metal compound(s):

(C-1) The particle concentration remarkably depends upon the amounts of the zirconium compound and the alkali metal and/or alkaline earth metal compound(s) and are enlarged as the amounts increase.

(C-2) The average particle diameter remarkably varies by the amounts of the phosphorus compound and the zirconium compound. When the other conditions are constant, the average particle diameter reduces if the amount of either the phosphorus compound or the zirconium compound is increased, and enlarges if the amount of the alkali metal and/or alkaline earth metal compound(s) is increased. The particle size is generally from about 0.2 to $3\mu$, though it can be controlled in the above described manner.

(C-3) The particle size distribution remarkably varies by the ratio and time of addition of the zirconium compound and the alkali metal and/or alkaline earth metal compound(s). The more the proportion of the zirconium atom to the total amount of the zirconium compound and the alkali metal and/or alkaline earth metal compound(s) increase, the more the particle size distribution sharpens. To the contrary, the more the proportion of the alkali metal and/or alkaline earth metal compound(s) increase, the more the particle size distribution broadens. When the proportion between the zirconium compound and the alkali metal and/or alkaline earth metal compound(s) is constant, the particle size distribution varies depending upon the amount of the phosphorus compound and sharpens if the amount increases. Further, when the amounts of the zirconium compound, the phosphorus compound and the alkali metal and/or alkaline earth metal compound(s) are constant, the particle size distribution varies depending upon the adding time of these compounds and sharpens if the zirconium compound and the alkali metal and/or alkaline earth metal compound(s) are added at the initiation of the ester-exchange or esterification reaction. On the other hand, the particle size distribution broadens if the zirconium compound and the alkali metal and/or alkaline earth metal compound(s) are added at the stage where the ester-exchange or esterification somewhat proceeded.

The behavior of generation of particles complicatedly varies depending upon the kind, amount, proportion and adding time of the above compounds.

On the production of the polyester, it is practically preferable to use an ester-exchange catalyst and a polycondensation catalyst in addition to the above additive compounds. The ester-exchange catalyst may be chosen from conventional ones such as zinc compounds, manganese compounds and cobalt compounds. The alkali metal and/or alkaline earth metal compound(s), which are the additives for particle formation, can serve as the ester-exchange catalyst. Also, the polycondensation catalyst may be chosen from conventional ones such as antimony compounds, germanium compounds and titanium compounds.

In addition to the above internal particles, the film of the invention may contain external particles comprising inorganic and/or organic fine particles.

The biaxially stretched film may be produced from the above described polyester composition by any conventional method such as successive stretching or simultaneous stretching. Also, the film may be pre- or post-stretched in the machine and/or transverse direction(s) before or after biaxial stretching. The stretch ratio may be from 2.5 to 4.5 in both the machine and transverse directions, and the temperature at stretching may be from 80° to 120° C. Thermosetting may be carried out at a temperature of 150° to 250° C. for a period of 1 to 10 seconds.

The film according to the invention has ordinarily, however, not limitedly, the following properties: strength at break, 15–40 kg/mm$^2$; elongation at break: 30–130%; Young's modulus: 300–800 kg/mm$^2$; modulus at 5% elongation: 7–20 kg/mm$^2$; transparency: more than 85%.

Also usable is a method in which the draw ratio either in the machine direction or in the transverse direction is increased to intensify the orientation, for example, a film is stretched at an ordinary draw ratio in the transverse direction and at an increased draw ratio in the machine direction or a film is re-stretched in the machine direction after stretching in the transverse and machine directions at ordinary draw ratios. Since the surface roughness density, surface roughness and slipping property decrease in such a film as intensified in orientation for increasing the mechanical strength, as compared with an ordinarily stretched film, it is necessary to increase the particle concentration and enlarge the particle diameter in the polyester composition for use in the field in which the slipping property is strictly demanded as compared with that for the ordinarily stretched film. The film of the invention is suitable for these purposes, because the particle diameter in the polyester composition used for the film of the invention can be easily controlled as aforementioned.

The biaxially stretched film according to the invention can be used in various fields owing to its easier controllability of surface properties. Typical examples of the application fields are classified in terms of the additive compounds for particle formation in the followings:

(1) Binary system of the zirconium compound and the phosphorus compound

Since the polyester film produced using this system contains extremely fine particles in high concentration and has excellent transparency, it is adapted for use in which surface smoothness and transparency are stringently required. For example, this film is suitable to an ordinary vacuum metallized film or a base film for vacuum metallized videotape owing to its superior surface smoothness, and to a packaging film or an optical film owing to its excellent transparency. In addition, this film is suitable to use in electric field such as condenser film because it does not contain alkali metal compound and/or alkaline earth metal compound which deteriorate electric properties.

(2) Unitary system of the zirconium compound and ternary or quaternary system of the zirconium compound, the phosphorus compound and the alkali metal and/or alkaline earth metal compound(s)

The films produced using these systems are suitable to a base film for ordinary magnetic tape, because various properties such as surface smoothness, slipperiness, abrasion resistance, etc. are well balanced in these films.

Presence of the internal particle containing the zirconium atom in the polyester composition and the polyester film according to the invention can be confirmed by dissolving the polyester composition or the polyester film in o-chlorophenol, separating an insoluble substance by centrifugation and analyzing the insoluble substance by atomic emission analysis.

For better understanding of the present invention, a detailed description will be given by means of the following Examples, wherein part(s) are by weight unless otherwise stated. Physical properties described in the Examples were determined by the following methods:

Esterification rate was obtained from the amount of carboxyl groups remained in the reaction product and the saponification value of the reaction product.

Intrinsic viscosity $[\eta]$ was measured at 30° C. using a solution of the polymer in a mixed solvent of phenol (6 parts) and tetrachloroethane (4 parts).

Amount of diethylene glycol in the polymer was determined as mol % to ethylene glycol by the aid of gas-chromatography using methanolyzed polymer.

Particle diameter, particle size distribution and particle concentration were determined by examining a film obtained by a method described in Example 1 with a reflective dark-field microscope.

Maximum surface roughness ($R_T$) and average center-line roughness ($R_A$) were determined by the aid of a surface roughness meter (model: "Surfcom 300A") uner the following conditions: needle diameter, $1\mu$; weighing, 0.07 g; standard length of measurement, 0.8 mm; cut off, 0.08 mm. Indication was made on the average of 10 measurements.

Film haze was determined by the aid of a direct vision hazeometer (manufactured by Toyo Seiki K.K.).

Kinetic friction coefficient was determined according to ASTM D-1894-63T under the conditions of 23° C., 65% RH and 200 m/minutes of pulling speed.

EXAMPLE 1

A mixture of 50 parts of terephthalic acid and 28 parts of ethylene glycol was subjected to esterification using 0.022 part of antimony trioxide (corresponding to 318 ppm of antimony atom to the final polyester). To the obtained stock product having an esterification rate of 95% was added a slurry consisting of 100 parts of terephthalic acid, 56 parts of ethylene glycol and 0.044 part of antimony trioxide. Esterification was effected in a nitrogen atmosphere keeping a pressure of 2.5 kg/cm² and a temperature of 24° C. for 90 minutes to give a product having an esterification rate of 95%.

The esterification product (corresponding to 100 parts of terephthalic acid) was charged in a polycondensation reactor at 240° C., and 3.18 parts (by volume) of a solution of zirconyl acetate in ethylene glycol having a concentration of 0.1 mol/liter (corresponding to 300 ppm of zirconium atom to the final polyester) were added thereto. The mixture was stirred at the same temperature under the atmospheric pressure for 15 minutes. Then, the temperature was gradually raised to 275° C. over a period of 30 minutes, while the pressure was slowly reduced to 0.05 mmHg. The polycondensation reaction was continued at the same temperature under the same pressure for 80 minutes. The produced polyethylene terephthalate had an intrinsic viscosity $[\eta]$ of 0.638 and a diethylene glycol content of 2.2 mol % and was excellent in transparency.

The polymer was melted and extruded at 290° C. into a film, which was stretched by 3.5 times in the machine direction at 90° C. and by 3.5 times in the transverse direction at 130° C. and subjected to heat treatment at 220° C. to form a film having a thickness of 15 $\mu$m, a kinetic friction coefficient of 0.45, a film haze of 0.7%, a maximum surface roughness ($R_T$) of $0.21\mu$ and an average center-line roughness ($R_A$) of $0.029\mu$. On examining with a reflective dark-field microscope, innumerable fine particles having a diameter of $1-2\mu$ were observed, however, no coarse particle having a diameter of more than 5 $\mu$m was observed in examining 36 different places at 200 magnification. Distribution of the particle size was medium.

COMPARATIVE EXAMPLE 1

The polycondensation reaction as in Example 1 was substantially repeated except that zirconyl acetate was not used. The obtained polymer had an intrinsic viscosity [η] of 0.632 and a diethylene glycol content of 2.2 mol % and was excellent in transparency.

The polymer was melted and extruded at 290° C. into a film, which was stretched by 3.5 times in the machine direction at 90° C. and by 3.5 times in the transverse direction at 130° C. and subjected to heat treatment at 220° C. to form a film having a thickness of 15 μm and a film haze of 0.2%. The film was very poor in slipage and not uniform. The kinetic friction coefficient of this film could not be measured because value exceeded the scale. On examining with a reflective dark-field microscope, no particle was observed.

EXAMPLE 2

A mixture of 50 parts of terephthalic acid and 28 parts of ethylene glycol was subjected to esterification using 0.022 part of antimony trioxide (corresponding to 318 ppm of antimony atom to the final polyester). To the obtained stock product having an esterification rate of 95% was added a slurry consisting of 100 parts of terephthalic acid, 56 parts of ethylene glycol and 0.44 part of antimony trioxide. Esterification was effected in a nitrogen atmosphere keeping a pressure of 2.5 kg/cm$^2$ and a temperature of 240° C. for 90 minites to give a product having an esterification rate of 95%.

The esterification product (corresponding to 100 parts of terephthalic acid) was charged in a condensation-polymerization reactor at 240° C., and 3.81 parts (by volume) of a solution of zirconyl acetate in ethylene glycol having a concentration of 0.1 mol/liter (corresponding to 300 ppm of zirconium atom to the final polymer) were added thereto. The mixture was stirred at the same temperature under the atmospheric pressure for 15 minutes, and 1.07 parts (by volume) of a solution of trimethyl phosphate in ethylene glycol having a concentration of 100 g/liter (corresponding to 204 ppm of phosphorus atom to the final polymer; Zr/P ratio being 0.5) were added thereto. Stirring was continued at the same conditions for 10 minutes. Then, the temperature was gradually raised to 275° C. over a period of 30 minutes, while the pressure was slowly reduced to 0.05 mmHg. The reaction was continued at the same temperature under the same pressure for 80 minutes. The produced polyethylene terephthalate had an intrinsic viscosity [η] of 0.630 and a diethylene glycol content of 2.2 mol % and was excellent in transparency.

The polymer was melted and extruded at 290° C. into a film, which was stretched by 3.5 times in the machine direction at 90° C. and 3.5 times in the transverse direction at 130° C., and subjected to heat treatment at 220° C. to form a film having a thickness of 15 μm, a kinetic friction coefficient of 0.50, a film haze of 0.4%, a maximum surface roughness ($R_T$) of 0.09μ, an average center-line roughness ($R_A$) of 0.010μ and surface roughness density of 110/mm. On examining with a reflective dark-field microscope, innumerable fine particles having a diameter of 0.3–0.6μ were obseved; however, no coarse particle having a diameter of more than 3 μm was observed in examining 36 different places at 200 magnification.

COMPARATIVE EXAMPLE 2

The polycondensation reaction as in Example 2 was substantially repeated except that zirconyl acetate was not used. The obtained polymer had an intrinsic viscosity [η] of 0.630 and a diethylene glycol content of 2.4 mol % and was excellent in transparency.

The polymer was extruded under the same conditions as in Example 1 into a film having a film haze of 0.2%. The film was very poor in slipage and not uniform. The kinetic friction could not be measured because value exceeded the scale. On examining a reflective dark-field microscope, no particle was observed and hence the surface of the film was flat and not irregular.

EXAMPLES 3 TO 10

The polycondensation reaction and extruding as in Example 1 were substantially repeated except that the kind and the amounts of the zirconium compound and the phosphorus compound were varied as shown in Table 1. Properties of the films are shown in Table 1.

TABLE 1

| | | Condition for addition | | | |
| --- | --- | --- | --- | --- | --- |
| Example | Zirconium compound | Amount of zirconium compound added in terms of Zr (ppm to PET*) | Phosphorus compound | Amount of phosphorus compound added in terms of P (ppm to to PET*) | Zr/P (atomic ratio) |
| 3 | Zirconium acetate | 300 | Trimethyl-phosphate | 51 | 2.0 |
| 4 | Zirconium acetate | 300 | Trimethyl-phosphate | 408 | 0.25 |
| 5 | Tetra-n-propyl-zirconate | 300 | Trimethyl-phosphate | 204 | 0.5 |
| 6 | Tetra-n-propyl-zirconate | 300 | Phosphoric acid | 204 | 0.5 |
| 7 | Tetra-n-propyl-zirconate | 300 | Phospho-rous acid | 204 | 0.5 |
| 8 | Tetra-n-propyl-zirconate | 300 | Triphenyl phosphite | 204 | 0.5 |
| 9 | Tetra-n-propyl-zirconate | 300 | Phenyl phosphonic acid | 204 | 0.5 |
| 10 | Tetra-n-propyl-zirconate | 150 | Trimethyl phosphate | 204 | 0.25 |

TABLE 1-continued

| Example | Kinetic friction coefficient ($\mu d$) | Maximum roughness at surface ($R_T \cdot \mu$) | Average roughness at centerline ($R_A \cdot \mu$) | Surface roughness density (number/mm) | Particle size ($\mu$) | Distribution of particle size | Film haze (%) |
|---|---|---|---|---|---|---|---|
| 3 | 0.60 | 0.07 | 0.008 | 150 | 0.2–0.5 | Narrow | 0.3 |
| 4 | 0.46 | 0.13 | 0.015 | 90 | 0.6–0.8 | Narrow | 0.4 |
| 5 | 0.49 | 0.09 | 0.011 | 110 | 0.3–0.6 | Narrow | 0.4 |
| 6 | 0.50 | 0.09 | 0.009 | 110 | 0.3–0.6 | Narrow | 0.4 |
| 7 | 0.48 | 0.10 | 0.011 | 110 | 0.3–0.6 | Narrow | 0.4 |
| 8 | 0.50 | 0.09 | 0.010 | 110 | 0.3–0.6 | Narrow | 0.4 |
| 9 | 0.52 | 0.09 | 0.008 | 110 | 0.3–0.6 | Narrow | 0.4 |
| 10 | 0.55 | 0.14 | 0.013 | 80 | 0.6–0.8 | Narrow | 0.3 |

Note:
*PET, polyethylene terephthalate

EXAMPLE 11

A stainless steel autoclave equipped with a stirrer, a distilling column and a pressure controller was charged with 519 parts of terephthalic acid, 431 parts of ethylene glycol, 0.16 part of triethylamine and 0.23 part of antimony trioxide and flushed with nitrogen. The contents were heated at 240° C. under a nitrogen pressure of 2.5 kg/cm² Gauge to effect esterification, while water was continuously removed from the top of the column. After a lapse of 120 minutes, the pressure was released to give a product having an esterification rate of 95%. To the esterification product was added 5.27 parts (by volume) of a solution of zirconyl acetate in ethylene glycol having a concentration of 0.1 mol/liter (corresponding to 80 ppm of zirconium atom to the final polyester). The mixture was stirred at the same temperature under the atmospheric pressure for 7 minutes, added with 5.92 parts (by volume) of a solution of sodium acetate in ethylene glycol having a concentration of 100 g/liter (corresponding to 276 ppm of sodium atom to the final polyester), stirred again under the same conditions for 8 minutes, admixed with 3.86 parts (by volume) of a solution of trimethyl phosphate in ethylene glycol having a concentration of 100 g/liter (corresponding to 142 ppm of phosphorus atom to the final polyester and to Zr+½Na/P=1.5 in atomic ratio) and stirred further under the same conditions for 10 minutes. Then, the mixture was transferred to a polycondensation reactor at 240° C. and heated gradually to 275° C. over a period of 30 minutes, while the pressure was slowly reduced to 0.05 mmHg. The polycondensation reaction was continued at the same temperature under the same pressure for 80 minutes.

The produced polymer had an intrinsic viscosity [η] of 0.637 and a diethylene glycol content of 2.1 mol % and was excellent in transparency. The polymer was extruded into a film having a thickness of 15μ in a manner similar to that in Example 1. Properties of the film are shown in Table 2.

EXAMPLE 12

A stainless steel autoclave equipped with a stirrer, a distilling column and a pressure controller was charged with 519 parts of terephthalic acid, 431 parts of ethylene glycol, 0.16 part of triethylamine, 0.23 part of antimony trioxide and 0.12 part of zirconyl acetate (corresponding to 80 ppm of zirconium atom to the final polyester). The contents were subjected to the esterification reaction in a manner similar to that in Example 2 to give a product having an esterification rate of 95%. The esterification product was added with 5.92 part (by volume) of a solution of sodium acetate in ethylene glycol having a concentration of 100 g/liter (corresponding to 276 ppm of sodium atom to the final polyester), stirred at the same temperature under the atmospheric pressure for 8 minutes, admixed with 3.86 parts (by volume) of a solution of trimethyl phosphate in ethylene glycol having a concentration of 100 g/liter (corresponding to 142 ppm of phosphorus atom to the final polyester and to Zr+½Na/P=1.5 in atomic ratio) and stirred further under the same conditions for 10 minutes. The polycondensation reaction was effected in a manner similar to that in Example 2 to give a polymer, which was extruded into a film having a thickness of 15μ according to the method as in Example 1. Properties to the film is shown in Table 2.

EXAMPLES 13 TO 26 AND COMPARATIVE EXAMPLES 3 TO 4

Polycondensation reaction was carried out according to the method as in Examples 11 and 12 but varying the amounts and the adding stage of zirconyl acetate and sodium acetate, and the kind and amount of the phosphorus compound as shown in Table 2. Then, the obtained polymers were extruded into films having a thickness of 15μ according to the method as in Example 1. Properties of the films are shown in Table 2.

TABLE 2

| | Polymerization condition | | | | | | | |
|---|---|---|---|---|---|---|---|---|
| | Zirconium acetate | | Sodium acetate | | Phosphorus compound | | | Zr + ½Na/P |
| | Amount (ppm)*1 | Stage added | Amount (ppm)*2 | Stage added | Kind | Amount (ppm)*3 | Stage added | (atomic ratio) |
| Example | | | | | | | | |
| 11 | 80 | A*4 | 276 | A | Trimethyl phosphate | 142 | A | 1.5 |
| 12 | 80 | B*5 | 276 | A | Trimethyl phosphate | 142 | A | 1.5 |

TABLE 2-continued

| | *1 | *4,5 | *2 | *4,5 | | *3 | *4,5 | |
|---|---|---|---|---|---|---|---|---|
| 13 | 80 | B | 276 | B | Trimethyl phosphate | 142 | A | 1.5 |
| 14 | 80 | A | 276 | B | Trimethyl phosphate | 142 | A | 1.5 |
| 15 | 300 | B | 276 | A | Trimethyl phosphate | 192 | A | 1.5 |
| 16 | 80 | A | 276 | A | Trimethyl phosphate | 178 | A | 1.2 |
| 17 | 80 | A | 276 | A | Trimethyl phosphate | 266 | A | 0.8 |
| 18 | 500 | A | 138 | A | Trimethyl phosphate | 175 | A | 1.5 |
| 19 | 300 | A | 276 | A | Trimethyl phosphate | 240 | A | 1.2 |
| 20 | 300 | A | 276 | A | Triphenyl phosphite | 240 | A | 1.2 |
| 21 | 300 | B | 276 | B | Triphenyl phosphite | 240 | A | 1.2 |
| 22 | 80 | A | 276 | A | Phosphoric acid | 142 | A | 1.5 |
| 23 | 80 | B | 276 | B | Phosphoric acid | 142 | A | 1.5 |
| 24 | 300 | B | 138 | B | Phenyl-phosphonic acid | 247 | A | 1.2 |
| 25 | 300 | A | 276 | A | Trimethyl phosphate | 144 | A | 2.0 |
| 26 | 300 | B | 276 | B | Trimethyl phosphate | 144 | A | 2.0 |
| Comparative | | | | | | | | |
| 3 | — | — | 276 | A | Trimethyl phosphate | 142 | A | — |
| 4 | — | — | 276 | B | Trimethyl phosphate | 142 | A | — |

| | Film property | | | | | | |
|---|---|---|---|---|---|---|---|
| | Kinetic friction coefficient ($\mu d$) | Maximum roughness at surface ($R_T \cdot \mu$) | Average roughness at centerline ($R_A \cdot \mu$) | Surface roughness density (number/mm) | Particle size ($\mu$) | Distribution particle size | Film haze (%) |
| Example | | | | | | | |
| 11 | 0.30 | 0.30 | 0.020 | 80 | 0.3–3 | Broad | 2.0 |
| 12 | 0.39 | 0.25 | 0.022 | 70 | 0.6–2 | Moderate | 2.5 |
| 13 | 0.45 | 0.15 | 0.015 | 95 | 0.6–1 | Narrow | 2.3 |
| 14 | 0.38 | 0.30 | 0.023 | 80 | 0.3–3 | Broad | 2.0 |
| 15 | 0.45 | 0.13 | 0.015 | 110 | 0.6–1 | Narrow | 2.5 |
| 16 | 0.40 | 0.27 | 0.015 | 80 | 0.3–3 | Broad | 1.7 |
| 17 | 0.52 | 0.08 | 0.008 | 100 | 0.3–0.6 | Narrow | 0.8 |
| 18 | 0.47 | 0.15 | 0.013 | 130 | 0.3–0.8 | Narrow | 1.0 |
| 19 | 0.38 | 0.25 | 0.015 | 120 | 0.4–2 | Moderate | 1.3 |
| 20 | 0.38 | 0.27 | 0.015 | 120 | 0.4–2 | Moderate | 1.2 |
| 21 | 0.45 | 0.11 | 0.012 | 110 | 0.4–0.7 | Narrow | 2.2 |
| 22 | 0.38 | 0.29 | 0.020 | 80 | 0.3–3 | Broad | 2.0 |
| 23 | 0.44 | 0.15 | 0.015 | 90 | 0.6–1 | Narrow | 2.5 |
| 24 | 0.45 | 0.10 | 0.010 | 130 | 0.4–0.6 | Narrow | 2.5 |
| 25 | 0.38 | 0.32 | 0.018 | 110 | 0.3–3 | Broad | 2.1 |
| 26 | 0.44 | 0.15 | 0.010 | 100 | 0.6–1 | Narrow | 2.8 |
| Comparative | | | | | | | |
| 3 | 0.50 | 0.24 | 0.017 | 30 | 1–2 | Narrow | 0.8 |
| 4 | 0.50 | 0.27 | 0.015 | 40 | 0.5–2 | Moderate | 1.5 |

Note:
*1, Amount added in terms of Zr;
*2, Amount added in terms of Na;
*3, Amount added in terms of P;
*4, A: after esterification;
*5, B: before esterification.

EXAMPLES 27 TO 36 AND COMPARATIVE EXAMPLES 5 AND 6

Polycondensation reaction was carried out according to the method as in Examples 11 and 12 but limiting the zirconium compound and the phosphorus compound respectively to zirconyl acetate and trimethyl phosphate, adding the alkali metal compound and varying the amounts and the adding stage of the above compounds. Then, the obtained polymers were extruded into films having a thickness of 15μ. Properties of the films are shown in Table 3.

TABLE 3

| | Polymerization condition | | | | | | | |
|---|---|---|---|---|---|---|---|---|
| | Zirconium acetate | | Alkali metal compound | | | Trimethyl phosphate | | Zr +½Na/P (atomic ratio) |
| | Amount (ppm)*1 | Stage added | Kind | Amount (ppm)*2 | Stage added | Amount (ppm)*3 | Stage added | |
| Example | | | | | | | | |
| 27 | 80 | A*4 | Lithium acetate | 83 | A | 142 | A | 1.5 |
| 28 | 80 | B*5 | Lithium acetate | 83 | A | 142 | A | 1.5 |
| 29 | 80 | B | Lithium acetate | 83 | B | 142 | A | 1.5 |
| 30 | 300 | B | Lithium acetate | 83 | A | 191 | A | 1.5 |
| 31 | 300 | A | Lithium acetate | 83 | A | 144 | A | 2.0 |
| 32 | 80 | A | Lithium acetate | 83 | A | 177 | A | 1.2 |
| 33 | 80 | A | Lithium acetate | 83 | A | 425 | A | 0.5 |
| 34 | 80 | A | Potassium acetate | 469 | A | 142 | A | 1.5 |
| 35 | 80 | B | Potassium acetate | 469 | A | 142 | A | 1.5 |
| 36 | 80 | B | Potassium acetate | 469 | B | 142 | A | 1.5 |
| Comparative | | | | | | | | |
| 5 | — | — | Lithium acetate | 83 | A | 142 | A | — |
| 6 | — | — | Potassium acetate | 469 | A | 142 | A | — |

| | Film property | | | | | | |
|---|---|---|---|---|---|---|---|
| | Kinetic friction coefficient ($\mu$d) | Maximum roughness at surface ($R_T \cdot \mu$) | Average roughness at center-line ($R_A \cdot \mu$) | Surface roughness density (number/mm) | Particle size ($\mu$) | Distribution of particle size | Film haze (%) |
| Example | | | | | | | |
| 27 | 0.38 | 0.32 | 0.020 | 80 | 0.3–3 | Broad | 2.0 |
| 28 | 0.38 | 0.25 | 0.025 | 70 | 0.6–2 | Moderate | 2.4 |
| 29 | 0.42 | 0.18 | 0.018 | 90 | 0.6–1 | Narrow | 2.6 |
| 30 | 0.45 | 0.13 | 0.015 | 110 | 0.6–1 | Narrow | 2.0 |
| 31 | 0.38 | 0.32 | 0.018 | 110 | 0.3–3 | Broad | 2.8 |
| 32 | 0.40 | 0.20 | 0.015 | 80 | 0.3–2 | Broad | 1.7 |
| 33 | 0.53 | 0.07 | 0.008 | 100 | 0.3–0.6 | Narrow | 0.7 |
| 34 | 0.38 | 0.32 | 0.022 | 75 | 0.3–3 | Broad | 2.5 |
| 35 | 0.40 | 0.24 | 0.025 | 70 | 0.6–2 | Moderate | 2.8 |
| 36 | 0.45 | 0.15 | 0.015 | 80 | 0.6–1 | Narrow | 2.8 |
| Comparative | | | | | | | |
| 5 | 0.50 | 0.35 | 0.020 | 35 | 0.6–4 | Broad | 1.0 |
| 6 | 0.51 | 0.40 | 0.020 | 40 | 0.6–4 | Broad | 1.5 |

Note:
*1, Amount added in terms of Zr;
*2, Amount added in terms of alkali metal atom;
*3, Amount added in terms of P;
*4, A: after esterification;
*5, B: before esterification.

It can be clearly seen from Tables 1 to 3 that the particle size, the distribution of particle size and the concentration of particle can be controlled over wide ranges by chainging the kind, amount and adding stage of various additives, and also that the properties of the surfaces of the films can be varied over wide ranges by controlling the particle size.

EXAMPLES 37 TO 50 AND COMPARATIVE EXAMPLE 7

Polycondensation reaction was carried out according to the method as in Examples 11 and 12 using calcium acetate in place of sodium acetate, varying the amounts and adding stage of zirconyl acetate and calcium acetate, and also varying the kind and amount of the phosphorus compound. The obtained polymers were extruded into films having a thickness of 15$\mu$ according to the method as in Example 1. Properties of the films are shown in Table 4.

TABLE 4

| Polymerization condition |
|---|

TABLE 4-continued

| | Zirconium acetate | | Calcium acetate | | Phosphorus compound | | | Zr + Na/P (atomic ratio) |
|---|---|---|---|---|---|---|---|---|
| | Amount (ppm)[*1] | Stage added | Amount (ppm)[*2] | Stage added | Kind | Amount (ppm)[*3] | Stage added | |
| Example | | | | | | | | |
| 37 | 80 | A[*4] | 400 | A | Trimethyl phosphate | 224 | A | 1.5 |
| 38 | 80 | B[*5] | 400 | A | Trimethyl phosphate | 224 | A | 1.5 |
| 39 | 80 | B | 400 | B | Trimethyl phosphate | 224 | A | 1.5 |
| 40 | 80 | A | 240 | A | Trimethyl phosphate | 163 | A | 1.3 |
| 41 | 80 | A | 240 | A | Trimethyl phosphate | 118 | A | 1.8 |
| 42 | 300 | A | 240 | A | Trimethyl phosphate | 191 | A | 1.5 |
| 43 | 300 | A | 400 | A | Trimethyl phosphate | 513 | A | 0.8 |
| 44 | 300 | A | 400 | A | Trimethyl phosphate | 228 | A | 1.8 |
| 45 | 300 | B | 400 | B | Trimethyl phosphate | 228 | A | 1.8 |
| 46 | 300 | B | 400 | B | Triphenyl phosphite | 228 | A | 1.8 |
| 47 | 300 | A | 400 | A | Triphenyl phosphite | 228 | A | 1.8 |
| 48 | 800 | A | 200 | A | Phosphoric acid | 284 | A | 1.5 |
| 49 | 300 | A | 360 | A | Phenyl phosphonic acid | 380 | A | 1.0 |
| 50 | 300 | B | 360 | B | Phenyl phosphonic acid | 380 | A | 1.0 |
| Comparative | | | | | | | | |
| 7 | — | — | 400 | A | Trimethyl phosphate | 224 | A | — |

| | Film property | | | | | | |
|---|---|---|---|---|---|---|---|
| | Kinetic friction coefficient ($\mu d$) | Maximum roughness at surface ($R_T \cdot \mu$) | Average roughness at centerline ($R_A \cdot \mu$) | Surface roughness density (number/mm) | Particle size ($\mu$) | Distribution of particle size | Film haze (%) |
| Example | | | | | | | |
| 37 | 0.38 | 0.35 | 0.025 | 80 | 0.3–3 | Broad | 2.1 |
| 38 | 0.38 | 0.25 | 0.022 | 70 | 0.6–2 | Moderate | 2.7 |
| 39 | 0.40 | 0.20 | 0.015 | 90 | 0.6–1 | Narrow | 2.4 |
| 40 | 0.52 | 0.08 | 0.008 | 90 | 0.3–0.6 | Narrow | 1.0 |
| 41 | 0.39 | 0.40 | 0.030 | 70 | 0.4–4 | Broad | 2.5 |
| 42 | 0.42 | 0.25 | 0.020 | 100 | 0.6–2 | Moderate | 1.6 |
| 43 | 0.48 | 0.15 | 0.012 | 110 | 0.3–0.8 | Narrow | 0.8 |
| 44 | 0.38 | 0.30 | 0.020 | 100 | 0.3–3 | Broad | 2.0 |
| 45 | 0.40 | 0.20 | 0.020 | 80 | 0.6–1 | Narrow | 2.5 |
| 46 | 0.38 | 0.20 | 0.022 | 80 | 0.6–1 | Narrow | 2.5 |
| 47 | 0.39 | 0.30 | 0.020 | 100 | 0.3–3 | Broad | 2.0 |
| 48 | 0.45 | 0.15 | 0.010 | 120 | 0.3–1 | Moderate | 1.0 |
| 49 | 0.42 | 0.25 | 0.020 | 100 | 0.6–2 | Moderate | 1.2 |
| 50 | 0.45 | 0.20 | 0.020 | 80 | 0.6–1 | Narrow | 2.5 |
| Comparative | | | | | | | |
| 7 | 0.50 | 0.26 | 0.010 | 30 | 0.6–2 | Moderate | 0.5 |

Note:
[*1], Amount added in terms of Zr;
[*2], Amount added in terms of Ca;
[*3], Amount added in terms of P;
[*4], A: after esterification;
[*5], B: before esterification.

EXAMPLES 51 TO 58 AND COMPARATIVE EXAMPLES 8 AND 9

Polycondensation reaction was carried out according to the method as in Examples 11 and 12 using various alkaline earth metal compounds in place of sodium acetate, varying the amounts and adding stage of zirconyl acetate and the alkaline earth metal compound, and also varying the kind and amounts of the phosphorus compound. The obtained polymers were extruded into films having a thickness of 15$\mu$ according to the method as in Example 1. Properties of the films are shown in Table 5.

TABLE 5

| | Polymerization condition | | | | | | | |
|---|---|---|---|---|---|---|---|---|
| | Zirconium acetate | | Alkaline earth metal compound | | | Trimethyl phosphate | | Zr + M/P |
| | Amount (ppm)*1 | Stage added | Kind | Amount (ppm)*2 | Stage added | Amount (ppm)*3 | Stage added | (atomic ratio) |
| Example | | | | | | | | |
| 51 | 80 | A*4 | Magnesium acetate | 243 | A | 225 | A | 1.5 |
| 52 | 80 | B*5 | Magnesium acetate | 243 | A | 225 | A | 1.5 |
| 53 | 80 | B | Magnesium acetate | 243 | B | 225 | A | 1.5 |
| 54 | 300 | A | Magnesium acetate | 243 | A | 515 | A | 0.8 |
| 55 | 300 | A | Magnesium acetate | 243 | A | 229 | A | 1.8 |
| 56 | 300 | B | Magnesium acetate | 243 | B | 229 | A | 1.8 |
| 57 | 300 | A | Strontium acetate | 525 | A | 191 | A | 1.5 |
| 58 | 300 | B | Strontium acetate | 525 | B | 191 | A | 1.5 |
| Comparative | | | | | | | | |
| 8 | — | — | Strontium acetate | 525 | A | 191 | A | — |
| 9 | — | — | Magnesium acetate | 243 | A | 142 | A | — |

| | Film property | | | | | | |
|---|---|---|---|---|---|---|---|
| | Kinetic friction coefficient ($\mu d$) | Maximum roughness at surface ($R_T \cdot \mu$) | Average roughness at centerline ($R_A \cdot \mu$) | Surface roughness density (number/mm) | Particle size ($\mu$) | Distribution of particle size | Film haze (%) |
| Example | | | | | | | |
| 51 | 0.38 | 0.30 | 0.019 | 85 | 0.3–3 | Broad | 2.0 |
| 52 | 0.40 | 0.22 | 0.020 | 70 | 0.6–2 | Moderate | 2.5 |
| 53 | 0.40 | 0.20 | 0.015 | 90 | 0.6–1 | Narrow | 2.3 |
| 54 | 0.48 | 0.15 | 0.012 | 110 | 0.3–0.8 | Narrow | 0.8 |
| 55 | 0.38 | 0.25 | 0.018 | 100 | 0.3–3 | Broad | 1.8 |
| 56 | 0.40 | 0.18 | 0.020 | 80 | 0.6–1 | Narrow | 2.5 |
| 57 | 0.42 | 0.30 | 0.022 | 90 | 0.6–3 | Broad | 2.2 |
| 58 | 0.40 | 0.20 | 0.021 | 70 | 0.6–1 | Narrow | 2.8 |
| Comparative | | | | | | | |
| 8 | 0.53 | 0.35 | 0.022 | 25 | 1–3 | Moderate | 2.6 |
| 9 | 0.50 | 0.25 | 0.016 | 35 | 1–2 | Narrow | 2.0 |

Note:
*1, Amount added in terms of Zr;
*2, Amount added in terms of alkaline earth metal atom;
*3, Amount added in terms of P;
*4, A: after esterification;
*5, B: before esterification.

EXAMPLES 59 TO 76 AND COMPARATIVE EXAMPLES 10 AND 11

Polycondensation reaction was carried out according to the method as in Examples 11 and 12 using various alkali metal or alkaline earth metal compounds in place of sodium acetate, varying the amounts and adding stage of zirconyl acetate and alkali metal or alkaline earth metal compounds, and also varying the kind and amounts of the phosphorus compound. The obtained polymers were extruded into films having a thickness of 15$\mu$ according to the method as in Example 1. Properties of the films are shown in Table 6.

TABLE 6(A)

| | Polymerization condition | | | | | | | | | | | |
|---|---|---|---|---|---|---|---|---|---|---|---|---|
| | Zirconium acetate | | Alkali metal compound | | | Alkaline earth metal compound | | | Phosphorus compound | | | TM/P |
| | Amount (ppm)*2 | Stage added | Kind | Amount (ppm)*3 | Stage added | Kind | Amount (ppm)*4 | Stage added | Kind | Amount (ppm)*5 | Stage added | (atomic ratio)*1 |
| Example | | | | | | | | | | | | |
| 59 | 80 | A*6 | Sodium acetate | 184 | A | Calcium acetate | 130 | A | Trimethyl phosphate | 168 | A | 1.5 |
| 60 | 80 | B*7 | Sodium acetate | 184 | A | Calcium acetate | 130 | A | Trimethyl phosphate | 168 | A | 1.5 |
| 61 | 80 | B | Sodium acetate | 184 | B | Calcium acetate | 130 | B | Trimethyl phosphate | 168 | A | 1.5 |

TABLE 6(A)-continued

| | Polymerization condition | | | | | | | | | | TM/P |
|---|---|---|---|---|---|---|---|---|---|---|---|
| | Zirconium acetate | | Alkali metal compound | | | Alkaline earth metal compound | | | Phosphorus compound | | (atomic ratio)*1 |
| | Amount (ppm)*2 | Stage added | Kind | Amount (ppm)*3 | Stage added | Kind | Amount (ppm)*4 | Stage added | Kind | Amount (ppm)*5 | Stage added | |
| 62 | 80 | A | Sodium acetate | 184 | B | Calcium acetate | 130 | A | Trimethyl phosphate | 168 | A | 1.5 |
| 63 | 300 | A | Sodium acetate | 184 | A | Calcium acetate | 130 | A | Trimethyl phosphate | 181 | A | 1.8 |
| 64 | 300 | A | Sodium acetate | 184 | A | Calcium acetate | 130 | A | Trimethyl phosphate | 217 | A | 1.5 |
| 65 | 300 | A | Sodium acetate | 184 | A | Calcium acetate | 130 | A | Trimethyl phosphate | 272 | A | 1.2 |
| 66 | 300 | A | Sodium acetate | 184 | A | Calcium acetate | 130 | A | Trimethyl phosphate | 408 | A | 0.8 |
| 67 | 300 | B | Sodium acetate | 184 | A | Calcium acetate | 130 | A | Trimethyl phosphate | 181 | A | 1.8 |
| 68 | 300 | A | Sodium acetate | 184 | A | Calcium acetate | 130 | A | Triphenyl phosphite | 217 | A | 1.5 |
| 69 | 300 | A | Sodium acetate | 184 | A | Calcium acetate | 130 | A | Phenyl phosphonic acid | 217 | A | 1.5 |
| 70 | 300 | B | Sodium acetate | 184 | B | Calcium acetate | 130 | B | Phenyl phosphonic acid | 217 | A | 1.5 |
| 71 | 500 | A | Sodium acetate | 92 | A | Calcium acetate | 65 | A | Phenyl phosphonic acid | 188 | A | 1.5 |
| 72 | 300 | A | Sodium acetate | 184 | A | Magnesium acetate | 78 | A | Trimethyl phosphate | 216 | A | 1.5 |
| 73 | 300 | A | Lithium acetate | 55 | A | Magnesium acetate | 78 | A | Trimethyl phosphate | 216 | A | 1.5 |
| 74 | 300 | A | Lithium acetate | 55 | A | Calcium acetate | 130 | A | Trimethyl phosphate | 181 | A | 1.8 |
| 75 | 300 | A | Lithium acetate | 55 | A | Calcium acetate | 130 | A | Trimethyl phosphate | 406 | A | 0.8 |
| 76 | 300 | B | Lithium acetate | 55 | B | Calcium acetate | 130 | B | Trimethyl phosphate | 181 | A | 1.8 |
| Comparative | | | | | | | | | | | | |
| 10 | — | — | Sodium acetate | 92 | A | Calcium acetate | 65 | A | Phenyl phosphonic acid | 188 | A | 0.6 |
| 11 | — | — | Lithium acetate | 55 | A | Calcium acetate | 130 | A | Trimethyl phosphate | 217 | A | — |

Note:
*1, TM = Zr + ½ alkali metal atom + alkaline earth metal atom;
*2, Amount added in terms of Zr;
*3, Amount added in terms of alkali metal atom;
*4, Amount added in terms of alkaline earth metal atom;
*5, Amount added in terms of P;
*6, A: after esterification;
*7, B: before esterification.

TABLE 6(B)

| | Film property | | | | | | |
|---|---|---|---|---|---|---|---|
| | Kinetic friction coefficient ($\mu d$) | Maximum roughness at surface ($R_T \cdot \mu$) | Average roughness at center-line ($R_A \cdot \mu$) | Surface roughness density (number/mm) | Particle size ($\mu$) | Distribution of particle size | Film haze (%) |
| Example | | | | | | | |
| 59 | 0.38 | 0.30 | 0.021 | 80 | 0.3–3 | Broad | 2.0 |
| 60 | 0.39 | 0.25 | 0.028 | 70 | 0.6–2 | Moderate | 2.5 |
| 61 | 0.43 | 0.15 | 0.015 | 70 | 0.6–1 | Narrow | 2.4 |
| 62 | 0.39 | 0.30 | 0.023 | 80 | 0.3–3 | Broad | 2.0 |
| 63 | 0.38 | 0.35 | 0.023 | 100 | 0.3–4 | Broad | 1.7 |
| 64 | 0.38 | 0.27 | 0.018 | 110 | 0.3–3 | Broad | 1.5 |
| 65 | 0.38 | 0.25 | 0.015 | 120 | 0.4–2 | Moderate | 1.3 |
| 66 | 0.50 | 0.08 | 0.008 | 120 | 0.3–0.6 | Narrow | 0.8 |
| 67 | 0.38 | 0.25 | 0.015 | 90 | 0.4–2 | Moderate | 2.5 |
| 68 | 0.38 | 0.29 | 0.020 | 110 | 0.3–3 | Broad | 1.5 |
| 69 | 0.37 | 0.29 | 0.019 | 110 | 0.3–3 | Broad | 1.3 |
| 70 | 0.42 | 0.20 | 0.018 | 90 | 0.6–1 | Narrow | 2.7 |
| 71 | 0.45 | 0.15 | 0.013 | 130 | 0.3–0.8 | Narrow | 0.8 |
| 72 | 0.38 | 0.23 | 0.017 | 110 | 0.3–3 | Broad | 1.3 |
| 73 | 0.38 | 0.23 | 0.018 | 110 | 0.3–3 | Broad | 1.3 |
| 74 | 0.40 | 0.25 | 0.018 | 105 | 0.3–3 | Broad | 1.7 |
| 75 | 0.52 | 0.07 | 0.008 | 120 | 0.3–0.6 | Narrow | 0.7 |
| 76 | 0.39 | 0.25 | 0.023 | 90 | 0.6–2 | Moderate | 2.7 |
| Comparative | | | | | | | |
| 10 | 0.65 | 0.20 | 0.007 | 30 | 0.5–1 | Narrow | 0.5 |

TABLE 6(B)-continued

| | Film property | | | | | | |
|---|---|---|---|---|---|---|---|
| | Kinetic friction coefficient ($\mu d$) | Maximum roughness at surface ($R_T \cdot \mu$) | Average roughness at center-line ($R_A \cdot \mu$) | Surface roughness density (number/mm) | Particle size ($\mu$) | Distribution of particle size | Film haze (%) |
| 11 | 0.50 | 0.27 | 0.012 | 40 | 0.5–2 | Moderate | 0.9 |

EXAMPLE 77

A polymerization reactor was charged with 1000 parts of dimethyl terephthalate, 800 parts of ethylene glycol and 0.226 part of zinc acetate (dihydrate). The contents were subjected to ester-exchange reaction by heating at 195° C. for 2.5 hours under a nitrogen atmosphere. The ester-exchange product was mixed with 0.23 part of antimony trioxide (corresponding to 194 ppm of antimony atom to the final polyester) and 1.95 parts of tetra-n-propyl zirconate di-n-propanolate (corresponding to 401 ppm of zirconium atom to the final polyester) and heated at the same temperature for 15 minutes. The temperature was then gradually increased to 275° C. over a period of 240 minutes, while the pressure was slowly reduced to 0.05 mmHg. The polycondensation reaction was continued under the same conditions for 70 minutes. The produced polymer had an intrinsic viscosity [$\eta$] 0.638 and a diethylene glycol content of 2.5 mol % and was excellent in transparency.

EXAMPLE 78

Example 77 was repeated except that the amount of tetra-n-propyl zirconate 2-n-propanolate was decreased to 1.45 parts (corresponding to 300 ppm of zirconium atom to the final polyester) and that 1.37 parts of trimethyl phosphate (corresponding to 306 ppm of phosphorus atom to the final polyester and to Zr/P=0.33) were added. The obtained polymer was extruded into a film according to the method as in Example 1. The film was comparable in quality to that obtained in Example 2.

EXAMPLE 79

A polymerization reactor was charged with 1000 parts of dimethyl terephthalate, 800 parts of ethylene glycol and 1.04 parts of calcium acetate monohydrate (corresponding to 240 ppm of calcium atom to the final polyester). The contents were subjected to ester-exchange reaction by heating at 195° C. for 4 hours under a nitrogen atmosphere. The temperature raised as the reaction proceeded and reached finally 225° C. To the reaction product were added 31.67 parts (by volume) of a solution of antimony trioxide in ethylene glycol having a concentration of 12 g/liter and 32.55 parts (by volume) of a 0.1 mol % solution of zirconyl acetate (corresponding to 300 ppm of zirconium atom to the final polyester). The mixture was stirred at the same temperature under the atmospheric pressure for 15 minutes, admixed with 10.70 parts (by volume) of a solution of trimethyl phosphate in ethylene glycol having a concentration of 100 g/liter (corresponding to 239 ppm of phosphorus atom to the final polyester and to Zr+Ca/P=1.2 in atomic ratio) and stirred again at the same temperature under the same pressure for 10 minutes. Then, the temperature was gradually raised to 275° C. over a period of 40 minutes, while the pressure was slowly reduced to 0.05 mmHg. The polycondensation reaction was continued under the same conditions for 80 minutes. The produced polyethylene terephthalate had an intrinsic viscosity [$\eta$] of 0.630 and contained a diethylene glycol content of 1.3 mol %. The polymer was extruded into a film having a thickness of 15 according to the method as in Example 1.

The film had a kinetic friction coefficient ($\mu d$) of 0.38, a maximum surface roughness ($R_T$) of 0.25$\mu$, an average center-line roughness ($R_A$) of 0.015$\mu$, a surface roughness density of 90/mm and a film haze of 1.5%. Particle size of the precipitated particles was 0.3–2$\mu$, and distribution of particle size was medium.

EXAMPLE 80

Polycondensation was effected as in Example 2 except that a 10% slurry of calcium carbonate in ethylene glycol (prepared by dispersing calcium carbonate powder in ethylene glycol by the aid of a homogenizer and cutting the coarse particles in the dispersion by the aid of a centrifugal separator to make a dispersion of particles of 0.38 micron in average particle size) (0.29 part) was added to the reaction system in an amount of 250 ppm to the polyester to be produced 10 minutes after the addition of a solution of trimethyl phosphite in ethylene glycol thereto. The produced polymer was molded to make a film of 15 microns in thickness. The film was set on a take-up machine and run at a high rate in contact with a guide pin made of chromium of hard quality, and the amount of the produced snow dust was macroscopically determined. In comparison of the determined amount with that on the film obtained in Example 2, improvement of the abrasion resistance was confirmed.

What is claimed is:

1. A biaxially stretched polyester film comprising a polyester and zirconium as an internal particle material and having good slipping property and transparency, prepared by polycondensation of terephthalic acid or its esterified derivative and alkylene glycol as the major essential monomeric components in the presence of a polycondensation catalyst chosen from antimony compounds, titanium compounds and germanium compounds, during which zirconium in the form of any zirconium compound comprising zirconium as the sole metallic component in an amount of 80 to 2500 ppm in terms of zirconium to the polyester as produced being introduced into the reaction system at a stage after the initiation of the reaction and before the intrinsic viscosity of the reaction mixture reaching 0.2, and subjecting the produced polyester to film forming.

2. The film according to claim 1, wherein a phosphorus compound is also introduced into the reaction system.

3. The film according to claim 2, wherein the amounts of the zirconium compound and the phosphorus compound to be introduced satisfy the following relationships:

$80 \leq [Zr] \leq 2500$
$0.1 \leq Zr/P \leq 10$ wherein [Zr] represents the amount of the zirconium compound in terms of zirconium atom by ppm to the polyester as produced and Zr/P represents an atomic ratio.

4. The film according to claim 2, wherein an alkali metal compound is also introduced into the reaction system.

5. The film according to claim 4, wherein the amounts of the zirconium compound, the phosphorus compound and the alkali metal compound to be introduced satisfy the following relationships:

$20 \leq [Zr] \leq 2000$ $50 \leq [M_1] \leq 500$ $0.1 \leq (Zr + \frac{1}{2}M_1)/P \leq 5$ wherein [Zr] represents the amount of the zirconium compound in terms of zirconium atom by ppm to the polyester as produced, $[M_1]$ represents the amount of the alkali metal compound in terms of alkali metal atom by ppm to the polyester as produced and $(Zr + \frac{1}{2}M_1)/P$ represents an atomic ratio.

6. The film according to claim 2, wherein an alkaline earth metal compound is also introduced into the reaction system.

7. The film according to claim 6, wherein the amounts of the zirconium compound, the phosphorus compound and the alkaline earth metal compound to be introduced satisfy the following relationships:

$20 \leq [Zr] \leq 2000$ $50 \leq [M_2] \leq 500$ $0.5 \leq (Zr + M_2)/P \leq 3$ wherein [Zr] represents the amount of the zirconium compound in terms of zirconium atom by ppm to the polyester as produced, $[M_2]$ represents the amount of the alkaline earth metal compound in terms of alkaline earth metal atom by ppm to the polyester as produced and $(Zr + M_2)/P$ represents an atomic ratio.

8. The film according to claim 2, wherein an alkali metal compound and an alkaline earth metal compound are also introduced into the reaction system.

9. The film according to claim 8, wherein the amounts of the zirconium compound, the phosphorus compound, the alkali metal compound and the alkaline earth metal compound to be introduced satisfy the following relationships:

$20 \leq [Zr] \leq 2000$ $20 \leq [M_1] \leq 300$ $20 \leq [M_2] \leq 300$ $0.5 \leq (Zr + \frac{1}{2}M_1 + M_2)/P \leq 3$ wherein [Zr] represents the amount of the zirconium compound in terms of zirconium atom by ppm to the polyester as produced, $[M_1]$ represents the amount of the alkali metal compound in terms of alkali metal atom by ppm to the polyester as produced, $[M_2]$ represents the amount of the alkaline earth metal compound in terms of alkaline earth metal atom by ppm to the polyester as produced and $(Zr + \frac{1}{2}M_1 + M_2)/P$ represents an atomic ratio.

10. The film according to claim 1, wherein the ester exchange reaction is carried out in the presence of an ester exchange catalyst.

11. The film according to claim 10, wherein the ester exchange catalyst is chosen from alkali metal compounds and alkaline earth metal compounds.

12. The film according to claim 11, wherein the introduction of the zirconium compound is effected at a stage after the initiation of the ester exchange reaction and before the intrinsic viscosity of the reaction mixture reaching 0.2 and the introduction of the phosphorus compound is effected at a stage after the completion of the ester exchange reaction and before the intrinsic viscosity of the reaction mixture reaching 0.2.

13. The film according to claim 12, wherein the amounts of the zirconium compound and the phosphorus compound satisfy the following relationships:

$20 \leq [Zr] \leq 2000$ $0.5 \leq (Zr + M_3)/P \leq 3$ wherein [Zr] represents the amount of the zirconium compound in terms of zirconium atom by ppm to the polyester as produced and $(Zr + M_3)/P$ represents an atomic ratio, $M_3$ being the molar number of the alkali metal and/or alkaline earth metal compound(s) by mol used as the ester exchange catalyst to the polyester as produced with the proviso that when $M_3$ represents the molar number of the alkali metal compound, such number is to be halved.

14. The film according to claim 11, wherein the introduction of the zirconium compound is effected at a stage after the initiation of the ester exchange reaction and before the intrinsic viscosity of the reaction mixture reaching 0.2, the introduction of the alkali metal and/or alkaline earth metal compound(s) is effected at a stage after the completion of the ester exchange reaction and before the intrinsic viscosity of the reaction mixture reaching 0.2 and the introduction of the phosphorus compound is effected at a stage after the completion of the ester exchange reaction and before the intrinsic viscosity of the reaction mixture reaching 0.2.

15. The film according to claim 14, wherein the amounts of the zirconium compound, the alkali metal and/or alkaline earth metal compound(s) and the phosphorus compound satisfy the following relationships:

$20 \leq [Zr] \leq 2000$ $50 \leq [M_4] + [M_5] \leq 500$ $0.5 \leq (Zr + M_4 + M_5)/P \leq 3$ wherein [Zr] represents the amount of the zirconium compound in terms of zirconium atom by ppm to the polyester as produced, $[M_4]$ is the amount of the alkali metal and/or alkaline earth metal compound(s) used as the ester exchange catalyst in terms of alkali metal and/or alkaline earth metal atom(s) by ppm to the polyester as used, $[M_5]$ is the amount of the alkali metal and/or alkaline earth metal compound(s) as introduced at the said stage in terms of alkali metal and/or alkaline earth metal atom(s) by ppm to the polyester as produced and $(Zr + M_4 + M_5)/P$ represents an atomic ratio, $M_4$ being the molar number of the alkali metal and/or alkaline earth metal compound(s) used as the ester exchange catalyst to the polyester as produced and $M_5$ being the molar number of the alkali metal and/or alkaline earth metal compound(s) as introduced at the said stage to the polyester as produced with the proviso that when $M_4$ or $M_5$ represents the molar number of the alkali metal compound, such number is to be halved.

16. The film according to claim 10, wherein the ester exchange catalyst is chosen from zinc compounds and manganese compounds.

17. The film according to claim 16, wherein the introduction of the zirconium compound is effected at a stage after the initiation of the ester exchange reaction and before the intrinsic viscosity of the reaction mixture reaching 0.2, the introduction of the alkali metal and/or alkaline earth metal compound(s) is effected at a stage after the completion of the ester exchange reaction and before the intrinsic viscosity of the reaction mixture reaching 0.2 and the introduction of the phosphorus compound is effected at a stage after the completion of the ester exchange reaction and before the intrinsic viscosity of the reaction mixture reaching 0.2.

18. The film according to claim 17, wherein the amounts of the zirconium compound, the zinc and/or manganese compound(s), the alkali metal and/or alkaline earth metal compound(s) and the phosphorus compound satisfy the following relationships:

$20 \leq [Zr] \leq 2000$
$50 \leq [M_6] \leq 500$
$0.5 \leq (Zr + M_6 + M_7)/P \leq 3$ wherein [Zr] represents the amount of the zirconium compound in terms of zirconium atom by ppm to the polyester as produced, $[M_6]$ is the amount of the alkali metal and/or alkaline earth metal compound(s) as introduced at the said stage in terms of alkali metal and/or alkaline earth metal atom(s) by ppm to the polyester as produced and $(Zr + M_6 + M_7)/P$ represents an atomic ratio, $M_6$ being the molar number of the alkali metal and/or alkaline earth metal compound(s) as introduced at the said stage to the polyester as produced and $M_7$ being the molar number of the zinc and/or manganese compound(s) used as the ester exchange catalyst to the polyester as produced.

19. The film according to claim 1, which comprises additionally fine particles of an inert substance in an amount of 20 to 1500 ppm to the polyester.

20. The film according to claim 1, wherein fine particles of an inert substance in an amount of 20 to 1500 ppm to the polyester as produced is introduced into the reaction system at the stage after the initiation of the reaction and before the intrinsic viscosity of the reaction mixture reaching 0.2.

* * * * *